(12) United States Patent
Rusiana et al.

(10) Patent No.: US 7,481,607 B2
(45) Date of Patent: Jan. 27, 2009

(54) MOUNTING JIG ASSEMBLY FOR A DOOR LATCH

(75) Inventors: Arturo D. Rusiana, Algonquin, IL (US); Kurt Shah, South Barrington, IL (US)

(73) Assignee: Architectural Builders Hardware Mfg., Inc., Itasca, IL (US)

( * ) Notice: Subject to any disclaimer, the term of this patent is extended or adjusted under 35 U.S.C. 154(b) by 141 days.

(21) Appl. No.: 11/580,471

(22) Filed: Oct. 13, 2006

(65) Prior Publication Data

US 2008/0089752 A1    Apr. 17, 2008

(51) Int. Cl.
*B23B 47/28*    (2006.01)

(52) U.S. Cl. .................... 408/115 R; 408/79

(58) Field of Classification Search ......... 408/72 R, 408/72 B, 79, 75, 97, 103, 115 R, 115 B, 408/241 B
See application file for complete search history.

(56) References Cited

U.S. PATENT DOCUMENTS

| | | | | |
|---|---|---|---|---|
| 2,633,040 A | * | 3/1953 | Schlage | 408/79 |
| 2,838,966 A | * | 6/1958 | Campbell | 408/115 R |
| 3,008,359 A | * | 11/1961 | Mackey | 408/115 R |
| 3,302,674 A | | 2/1967 | Russell et al. | |
| 4,130,930 A | * | 12/1978 | Webster | 29/466 |
| 4,176,989 A | * | 12/1979 | Wolff | 408/115 R |
| 5,116,170 A | | 5/1992 | Palmer et al. | |
| 5,154,548 A | * | 10/1992 | Walsh | 408/72 R |
| 5,222,845 A | | 6/1993 | Goldstein et al. | |
| 5,407,306 A | * | 4/1995 | Klapperich | 408/115 R |
| 5,915,891 A | | 6/1999 | Fridman | |
| 6,186,708 B1 | | 2/2001 | Fridman | |
| 6,343,632 B1 | | 2/2002 | Zivojinovic | |
| 6,394,713 B1 | * | 5/2002 | Yates, Sr. | 408/115 R |

* cited by examiner

*Primary Examiner*—Daniel W Howell
(74) *Attorney, Agent, or Firm*—Greer, Burns & Crain, Ltd.

(57) ABSTRACT

A mounting jig assembly for mounting a door handle to a door having a main door bore includes a drill jig constructed and arranged for placement on the door over the main door bore and having at least one mounting hole, wherein the drill jig is constructed and arranged for engaging a door latch at more than one location.

16 Claims, 2 Drawing Sheets

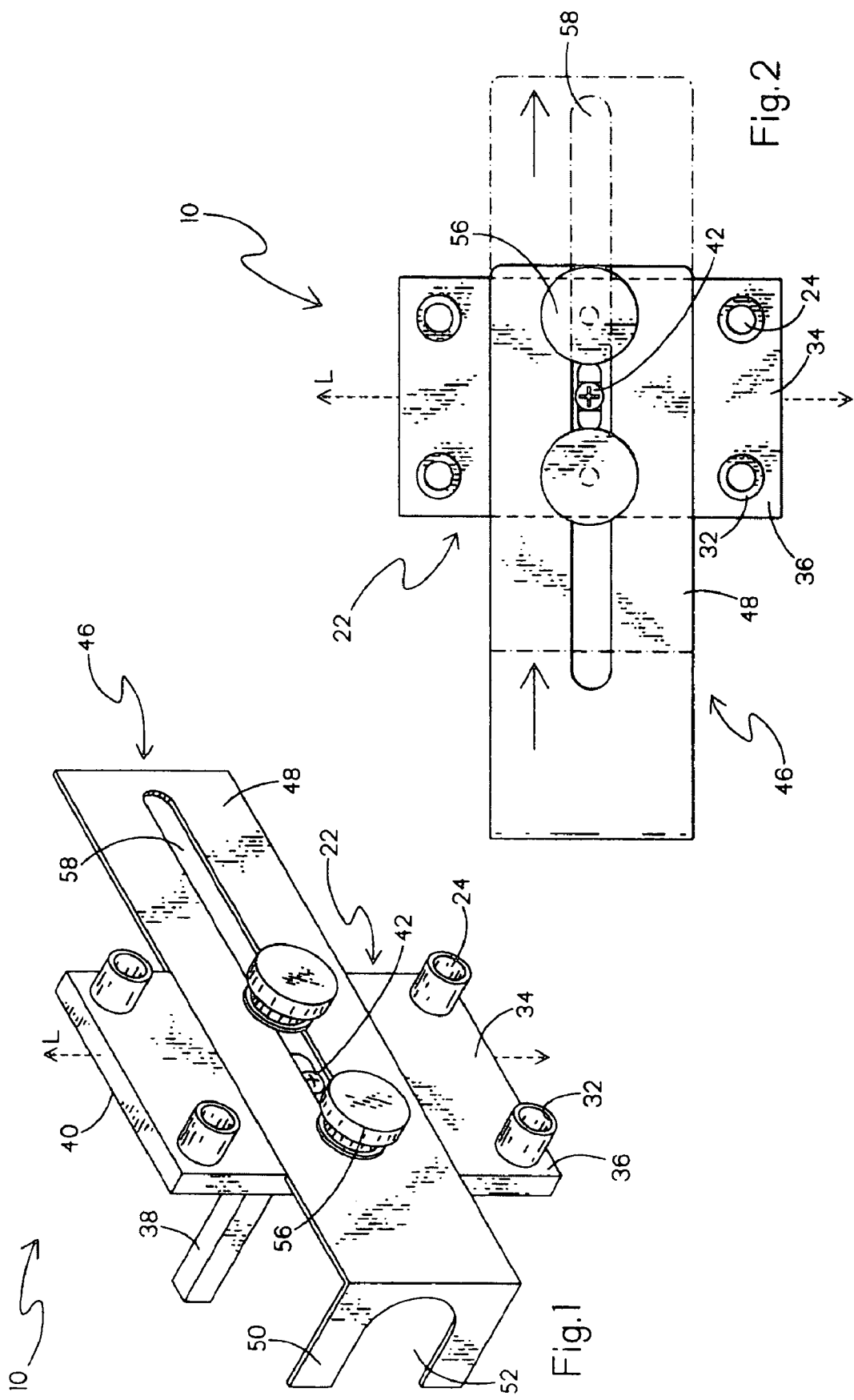

MOUNTING JIG ASSEMBLY FOR A DOOR LATCH

BACKGROUND OF THE INVENTION

The present invention generally relates to an assembly for mounting a door handle to a door, and more specifically relates to a mounting jig assembly for aligning and mounting a door handle over a main door bore.

Templates or guides for properly mounting door handles onto a door are well known in the building and construction industry. Generally, in a home owner application, a paper or light cardboard hole-locating template is provided with a purchased door handle assembly. A user wraps the template around an edge of the door in the location where the door handle is to be installed, and marks the centers of the required holes on the door with a pointed object. The user then drills the marked holes and installs the door handle.

Commercial installers generally use these templates in large scale projects and accordingly need a device for efficiently locating door handles during large construction or renovation projects involving many doors.

Most current templates are manufactured from paper or cardboard and can tear during use and be difficult to securely fasten to the door in the desired position. Accordingly, metal templates have been developed, such as U.S. Pat. No. 5,222,845 to Goldstein et al., which discloses an adjustable drill guide for door handles and locks. In Goldstein, a U-shaped member is configured for fitting around the edge of the door and is secured to the door by a C-clamp. A drill bushing is inserted between one end of the C-clamp and the door, and is then positioned over the main door bore. The user then utilizes the guide holes in the bushing to drill the necessary holes for mounting the door handle/lock. However, in Goldstein, the drill bushing is only secured to the door at one location (i.e., the door edge), and accordingly can still move out of position during drilling, preventing proper mounting of the door handle.

Another potential problem in Goldstein and other current mounting assemblies is a lack of adjustment where the main door bore is located closer to or further away from the door edge than in conventional doors. Although Goldstein provides a plurality of plate portions each configured for corresponding to a particular size of main door bore, there is no accommodation for depth or offset of the bore.

In U.S. Pat. No. 5,915,891 to Fridman, a drill guide for installing a door lock includes a plate with a centrally located plug configured for insertion into the main door bore. The plate includes a plurality of bushings and a level attached to a top edge of the plate. Using the level as a guide, the user drills holes through the bushings for properly mounting the door handle. Even though the level in Fridman acts as an alignment guide, there is still a chance for user error, which can cause misalignment of the door handle on the door. Further, in Fridman, misalignment can cause binding of the latch and handle component upon assembly, preventing the door handle from functioning properly.

U.S. Pat. No. 5,116,170 to Palmer et al. discloses a drill jig for mounting a cylindrical lock to a door including a main plate resting against the door and having guide holes for guiding the drilling of mounting holes. A cylindrical guide extends from the plate and is inserted into the main door bore, and has a groove for engaging a door latch for proper location of the door handle. However, one problem that can arise in Palmer is movement of the guide during drilling or due to imbalance or excessive play between the groove and the latch.

Accordingly, there is a need for an improved mounting jig assembly for a door handle that enables more accurate drilling of the mounting holes. There is also a need for a mounting jig assembly that provides a more stable guide for drilling the necessary mounting holes than that in current assemblies. Further, there is a need for a mounting jig assembly that can accommodate doors having main door bores located in a variety of offset positions.

BRIEF SUMMARY OF THE INVENTION

Each of the above-identified needs are met or exceeded by the present mounting jig assembly. Specifically, the present mounting jig assembly includes more than one alignment guide, providing more accuracy in drilling the mounting holes than in current assemblies. Also, the present mounting jig assembly includes an improved alignment guide structure that prevents movement or misalignment of the assembly during drilling. Further, the present mounting jig assembly includes an adjustable guide plate that accommodates various offsets of the main door bore.

More specifically, the present invention provides a mounting jig assembly for mounting a door handle to a door having a main door bore including a drill jig constructed and arranged for placement on the door over the main door bore and having at least one mounting hole, wherein the drill jig is constructed and arranged for engaging a door latch at more than one location.

BRIEF DESCRIPTION OF THE DRAWINGS

FIG. 1 is a top perspective view of a mounting jig assembly according to the present invention;

FIG. 2 is a front view of the mounting jig assembly of FIG. 1; and

DETAILED DESCRIPTION OF THE INVENTION

Figure 3:
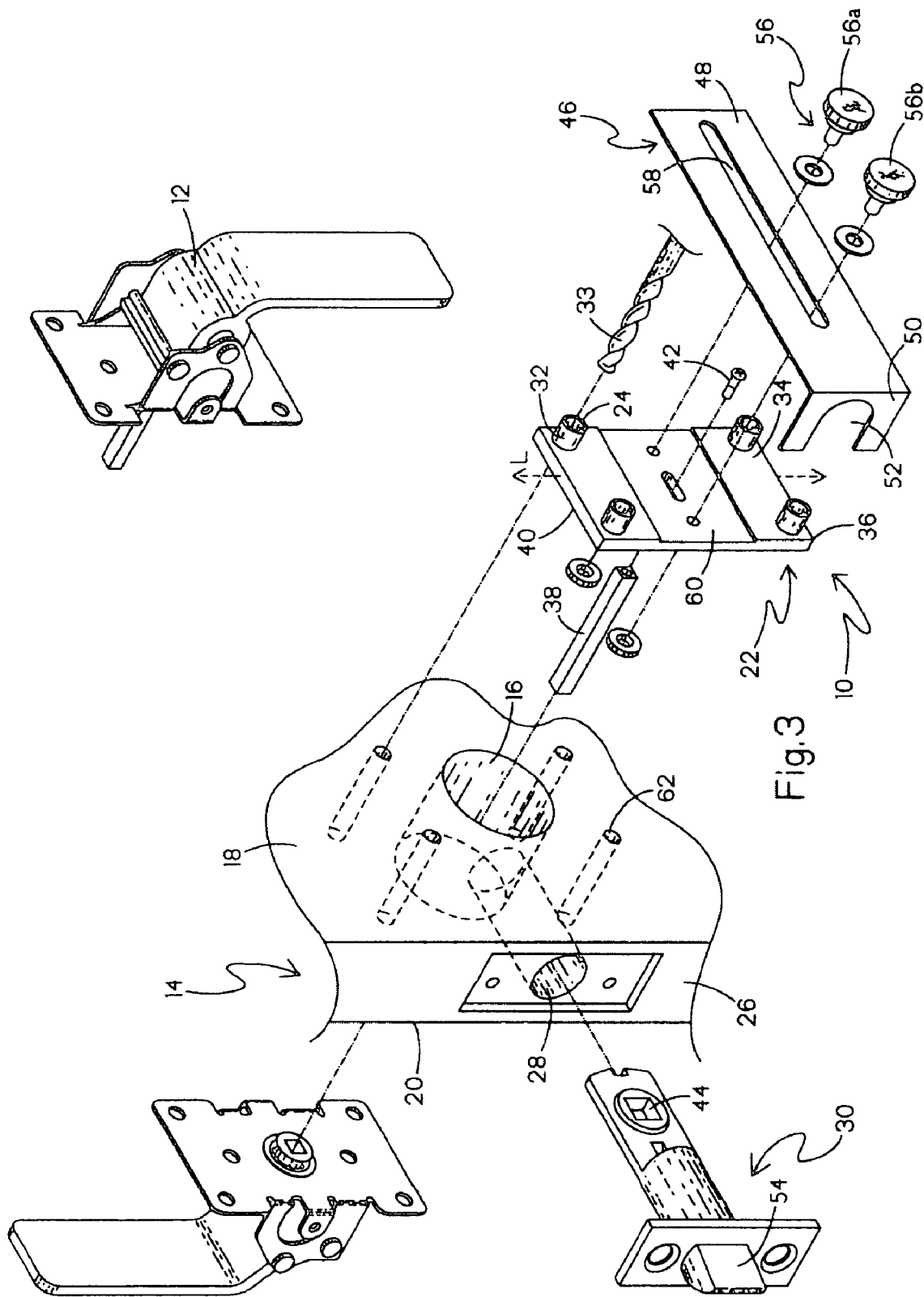
FIG. 3 is an exploded perspective view of the mounting jig assembly of FIG. 1 as it is attached to a door for mounting a door handle.

Referring to FIGS. 1-3, the present invention provides a mounting jig assembly, generally designated 10, for properly aligning a door handle assembly 12 for mounting to a door 14 having a main door bore 16. The handle assembly 12 has a mounting plate 13 upon which is mounted a transversely pivoting handle 15. It is important for binding free operation, as well as aesthetics, that the mounting plate 13 is properly positioned on the door 14. More specifically, mounting openings 17 on the plate 13 need to be properly aligned on the door 14.

As known in the art, the main door bore 16 is generally circular when viewed from a front side 18 or a rear side 20 of the door 14, although it is recognized that other configurations may be suitable. The mounting jig assembly 10 includes a drill jig 22 constructed and arranged for placement on the front side 18 or the rear side 20 of the door 14 over the main door bore 16 and having at least one mounting hole 24. The mounting holes 24 are disposed to correspond to the mounting openings 17 on mounting plate 13.

As seen in FIG. 3, the door 14 includes an edge 26 having an opening 28 constructed and arranged for receiving a door latch 30, as known in the art. It is contemplated that the drill jig 22 is constructed and arranged for engaging the door latch 30 at more than one location, which is described in further detail below.

Referring to FIGS. 1 and 3, the drill jig 22 includes at least one bushing 32 for receiving a drill 33, the bushing constructed and arranged for alignment with mounting hole 24. Each bushing 32 is preferably tubular in shape and extends generally perpendicularly to a longitudinal axis L of the drill jig. The bushing 32 is long enough to properly align the drill 33 so that mounting openings 17 are perpendicular to the door 14.

It is further contemplated that there are four bushings 32, each generally arranged at or near a corner 36 of the drill jig 22, and that there are four mounting holes 24 arranged complementary thereto. As known in the art, it is contemplated that this arrangement will provide a stable and secure attachment of the door handle 12 to the door 14. However, it is contemplated that the number and arrangement of the mounting holes 24 and bushings 32 may vary depending on the application.

The drill jig 22 further includes a shaft 38 extending generally perpendicularly from a rear face 40 of the drill jig and being constructed and arranged for engaging the door latch 30 within the main door bore 16. Preferably, the shaft 38 is attached to the rear face 40 by a fastener 42 passing through a slot in the jig 22 and is further secured to the drill jig by welding, to ensure secure and permanent attachment. However, it is appreciated that other fastener technologies may be suitable, as known in the art.

The shaft 38 has a substantially square cross-section and is configured for matingly engaging a cam 44 in the door latch 30 for centering the mounting jig assembly 10 around the main door bore 16. It is contemplated that the cam 44 has a substantially square cross-section complementary to that of the shaft 38. The shaft 38 corresponds to a similar door handle shaft 45 on the door handle assembly 12 to ensure proper alignment of the door handle assembly once it is mounted to the door 14.

The drill jig 22 also includes a guide plate 46 slidably attached to the drill jig and constructed and arranged for engaging the door latch 30 at the door edge 26. As seen in FIGS. 1 and 3, the guide plate 46 is preferably L-shaped and includes a first long leg 48 and an integrally formed second leg 50 extending generally perpendicularly from the first leg, the second leg being constructed and arranged for abutting against the door edge 26. The first leg 48 is preferably arranged substantially transverse to the longitudinal axis "L" of the drill jig 22 so that it lies flat against the front side 18 or the rear side 20 of the door 14, depending on the orientation of the jig 22. It is contemplated that this arrangement will ensure proper alignment of the door handle 12 on the door 14, although it is appreciated that other configurations for the guide plate 46 may be suitable, as known in the art.

The second leg 50 includes a generally U-shaped notch 52 constructed and arranged for engaging a latch bolt 54 of the door latch 30 that, upon insertion into the door 14, extends distally from the door edge 26. Although it is appreciated that other notch configurations may be suitable, the notch 52 provides a second attachment point between the mounting jig assembly 10 and the door latch 30. It is contemplated that by providing this second attachment point between the mounting jig assembly 10 and the door latch 30, the present arrangement is more secure and provides better alignment than conventional, single attachment point assemblies.

As seen in FIGS. 1 and 3, the guide plate 46 is slidably attached to the drill jig 22 by at least one jig fastener 56 and is constructed and arranged for aligning the drill jig on the door 14. Preferably, there is a pair of jig fasteners 56a, 56b arranged generally parallel to each other. To facilitate sliding, the guide plate 46 further defines a slot 58 and the drill jig 22 is slidable relative to the slot and transverse to the longitudinal axis L of the drill jig. The drill jig 22 includes a channel 60 arranged generally transverse to the longitudinal axis L of the drill jig and constructed and arranged for receiving the guide plate 46. It is contemplated that the channel 60 ensures proper alignment and sliding of the drill jig 22 relative to the guide plate 46 by maintaining the orientation of the guide plate 46 to the longitudinal axis L of the drill jig. Each jig fastener 56 passes through the slot 58 when engaging the drill jig 22 and enables the sliding and releasable fastening of the drill jig relative to the guide plate 46. While other dimensions may be suitable, preferably, the drill jig 22 is slidable within the slot 58 from approximately 2¾-5 inches away from the door edge 26 for accommodating various locations of the main door bore 16. This adjustability is beneficial over current mounting jig assemblies, because it accommodates different depths/offsets of the main door bore 16.

By providing the shaft 38 and the guide plate 46 as the two attachment points with the door latch 30, the mounting jig assembly 10 will be properly aligned over the main door bore 16 and will not be misaligned during drilling through the bushings 32 into the door 14.

In use, and assuming the latch 30 has been inserted into the door 14, a user first loosens each jig fastener 56, which enables the drill jig 22 to slide relative to the guide plate 46. The user then places the shaft 38 into the latch cam 44, and arranges the second leg 50 so that the notch 52 engages the latch bolt 54 and the second leg abuts against the door edge 26. Next, the drill jig 22 is slid relative to the guide plate 46 until the second leg 50 abuts against the door edge 26. Also, the jig 22 is pressed against the corresponding side 18, 20 of the door 14. At this point, it is contemplated that the mounting jig assembly 10 is securely attached to the door latch 30, preventing misalignment of the assembly during drilling. Once the mounting jig assembly 10 is placed flat against the front side 18 or the rear side 20 of the door 14, the user can then insert the drill 33 through each bushing 32 and drill holes 62 in the door corresponding to each mounting hole 24. After the holes 62 are drilled into the door 14, the user removes the mounting jig assembly 10 and can proceed with installation of the door handle 12.

While a particular embodiment of the present mounting jig assembly has been described herein, it will be appreciated by those skilled in the art that changes and modifications may be made thereto without departing from the scope of the invention and the appended claims.

The invention claimed is:

1. A mounting jig assembly for mounting a door handle to a door having a main door bore, comprising:
   a drill jig constructed and arranged for placement on the door over the main door bore and having at least one mounting hole, said drill jig including a shaft extending generally perpendicularly from a longitudinal axis of said drill jig and being constructed and arranged for engaging a door latch at more than one location within the main door bore, and a guide plate slidably attached to said drill jig and constructed and arranged for engaging said door latch at an edge of the door;
   wherein said shaft has a substantially square cross-section and is configured for matingly engaging a cam on said door latch for centering the mounting jig assembly around the main door bore.

2. The assembly of claim 1 wherein said guide plate includes a first long leg and a second leg extending generally perpendicularly from said first leg, said second leg being constructed and arranged for abutting against said door edge.

3. The assembly of claim 2 wherein said second leg includes a notch constructed and arranged for engaging a latch bolt of said door latch.

4. A mounting jig assembly for mounting a door handle to a door having a main door bore, comprising:
- a drill jig constructed and arranged for placement on the door over the main door bore and having at least one mounting hole; and
- a shaft extending generally perpendicularly from a longitudinal axis of said drill jig and being constructed and arranged for engaging a door latch within the main door bore, said shaft having a substantially square-shaped cross-section and is configured for matingly engaging a cam on said door latch for centering the mounting jig assembly around the main door bore.

5. The assembly of claim 4 wherein said drill jig includes at least one bushing for receiving a drill, said at least one bushing constructed and arranged for alignment with said at least one mounting hole.

6. The assembly of claim 4 further including a guide plate slidably attached to said drill jig by at least one fastener and being constructed and arranged for aligning said drill jig on the door.

7. The assembly of claim 6 wherein said guide plate includes a first long leg and a second leg extending generally perpendicularly from said first leg, said second leg constructed and arranged for abutting against an edge of the door and having a notch constructed and arranged for engaging a latch bolt on said door latch.

8. The assembly of claim 6 wherein said guide plate includes a slot and said drill jig is slidable relative to said slot transverse to said longitudinal axis of said drill jig.

9. The assembly of claim 8 wherein said at least one fastener engages said slot and enables said sliding and releasable fastening of said drill jig relative to said guide plate.

10. The assembly of claim 8 wherein said drill jig is slidable within said slot from approximately 2¾-5 inches away from an edge of the door for accommodating various locations of the main door bore.

11. A mounting jig assembly for mounting a door handle to a door having a main door bore, comprising:
- a drill jig constructed and arranged for placement on the door over the main door bore and having at least one mounting hole and at least one bushing configured for receiving a drill and being constructed and arranged for alignment with said at least one mounting hole; and
- a guide plate slidably attached to said drill jig by at least one fastener and being constructed and arranged for aligning said drill jig on the door; and
- a shaft having a generally square-shaped cross-section and extending generally perpendicularly from a longitudinal axis of said drill jig and being constructed and arranged for matingly engaging a cam on said door latch for centering the mounting jig assembly around the main door bore.

12. The assembly of claim 11 wherein said guide plate is generally L-shaped and includes a first long leg and a second leg extending generally perpendicularly from said first leg, said second leg constructed and arranged for abutting against an edge of the door.

13. The assembly of claim 12 wherein said second leg includes a notch constructed and arranged for engaging a latch bolt on said door latch.

14. The assembly of claim 11 wherein said guide plate includes a slot and said drill jig is slidable relative to said slot transverse to a longitudinal axis of said drill jig.

15. The assembly of claim 14 wherein said at least one fastener engages said slot and enables said sliding and releasable fastening of said drill jig relative to said guide plate.

16. The assembly of claim 14 wherein said drill jig is slidable within said slot from approximately 2¾-5 inches away from an edge of the door for accommodating various locations of the main door bore.

\* \* \* \* \*